United States Patent [19]

Osder

[11] 4,209,734
[45] Jun. 24, 1980

[54] DYNAMIC EQUALIZATION SYSTEM FOR DUAL CHANNEL AUTOMATIC PILOT

[75] Inventor: Stephen S. Osder, Scottsdale, Ariz.

[73] Assignee: Sperry Corporation, New York, N.Y.

[21] Appl. No.: 890,426

[22] Filed: Mar. 27, 1978

[51] Int. Cl.$^2$ .............................................. G05B 9/03
[52] U.S. Cl. .................................. 318/564; 318/565; 244/194
[58] Field of Search ............... 318/564, 565, 566, 580; 244/194

[56]  References Cited
U.S. PATENT DOCUMENTS

| | | | |
|---|---|---|---|
| 3,125,712 | 3/1964 | Meredith | 318/564 |
| 4,035,705 | 7/1977 | Miller | 318/564 |
| 4,079,906 | 3/1978 | Durandeau et al. | 318/564 |
| 4,094,481 | 6/1978 | DeWalt | 318/564 |

Primary Examiner—J. V. Truhe
Assistant Examiner—Eugene S. Indyk
Attorney, Agent, or Firm—Howard P. Terry

[57] ABSTRACT

Apparatus for controlling channel equalization in a monitored dual servo channel aircraft automatic flight control system, in which the limits of the equalization control are responsive to the commanded input signal to the control surface. Rate feedback means responsive to the output velocity of each channel are differentially summed and integrated to provide the signals for equalizing the dual servo channels. Limiter means responsive to the commanded input signal varies the limits of the equalization signals to allow very tight error detection thresholds of the system monitor without causing nuisance trips in situations where the system's normal tolerances are large.

5 Claims, 3 Drawing Figures

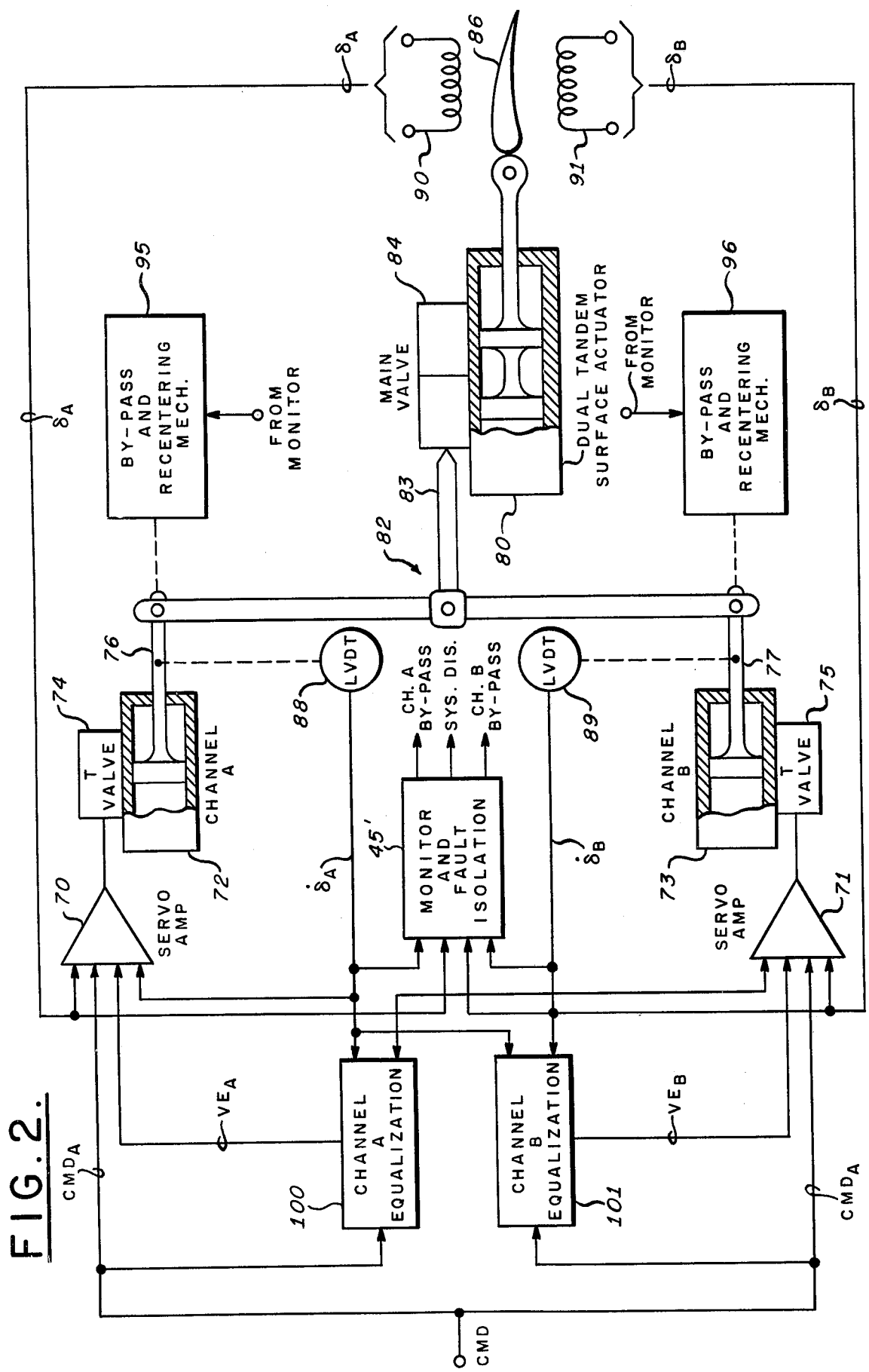

DYNAMIC EQUALIZATION SYSTEM FOR DUAL CHANNEL AUTOMATIC PILOT

CROSS REFERENCES TO RELATED CASES

The present invention is closely related to the present Applicant's copending application Ser. No. 890,745, now U.S. Pat. No. 4,162,438, filed concurrently herewith and entitled "Dual Servo Automatic Pilot with Improved Failure Monitoring", said application being assigned to the assignee hereof.

BACKGROUND OF THE INVENTION

1. Field of the Invention

The present invention relates to dual channel control systems and, more particularly, to dual channel control systems having improved channel equalization which permits the tightening of system monitor thresholds without causing nuisance failure warnings or disengagements.

2. Description of the Prior Art

Dual channel servo control systems are known in the prior art and one type thereof incorporating duplex differentially combined servomotors is exemplified by the system described in Applicant's assignee's pending U.S. Patent Application Ser. No. 811,653 entitled "Fail Passive Dual Servo with Continuous Motor Speed and Acceleration Monitoring", by M. P. DeWalt, filed June 30, 1977 and Applicant's assignee's U.S. Pat. Nos. 3,504,248 and 4,035,705, entitled "Dual Channel Servo System Having Torque Equalization" and "Fail Safe Dual Channel Automatic Pilot with Maneuver Limiting", respectively, issued on Mar. 31, 1970 and July 12, 1977, respectively, both by H. Miller. However, the present invention is also applicable to more conventional dual channel autopilots. For example, well known dual channel flight control systems utilizing differentially coupled hydraulic actuators.

The primary characteristic of the dual channel control systems is that the dual channel control actuators or motors must track each other in velocity and direction to accurately control the position of the output member such as a control surface in response to a commanded input. Such systems, no matter how carefully designed, may be subject to undesired spurious signals due to inherent servo amplifier unbalance, differences in signal output gradients and nulls of the various sensors in response to command signals, and other tolerance differences between the two channels.

In addition, it is noted that in such control systems, particularly of the duplex electromechanical differentially summed output type, the degree of unbalance may be of such magnitude as to result in full speed output of the motors in opposite directions with respect to each other, resulting in total loss of control authority of the system. Velocity equalization is also known in the art, such as the electrical equalization described in said U.S. Pat. No. 3,504,248, which may be utilized to provide an equalization signal, having set limits, to each channel such that the dual channel actuators track each other reasonably well and thereby provide adequate control authority. However, the monitor circuits of such prior systems must be sufficiently loose as to induce nuisance trips during large control commands, non-limitations and component tolerances.

Accordingly, as the velocity differential between the actuators, e.g., electromechanical or hydraulic actuators, may increase for large surface commands due, for example, to the position feedback synchro gradient mismatch, the velocity equalization may be subject to transient signals of magnitude greater than the velocity equalization fixed limits, resulting in nuisance monitor trips.

SUMMARY OF THE INVENTION

In accordance with the present invention, a dual channel control system is provided with equalization means coupled to the channels in a manner which forces the motors or actuators thereof to track each other even though the component signal gradients, tolerances and the like of each channel may vary over their dynamic ranges.

Specifically, the equalization means of this invention comprise integration means in each channel responsive to the difference in the velocities between both servomotors, and limiting means responsive to the input command for varying the limits on the equalization signals from the integration means. The equalization means further comprises switching logic means, responsive to the command signal and the unlimited equalization signal which forces the equalization integrator's output to reset to a value equal to or less than the instantaneously computed equalization limit.

BRIEF DESCRIPTION OF THE DRAWINGS

FIG. 2 illustrates an embodiment of the invention in connection with a dual channel hydraulic actuator control system.

DESCRIPTION OF THE PREFERRED EMBODIMENT

The present invention is utilized with dual channel servosystems that combine the outputs of the two channels to position an attitude control surface of an aircraft in response to a common command signal applied to both channels, or to dual redundant input command signals applied respectively to the channels. A property of such dual channel servosystems utilized advantageously in the invention is that motion of the attitude control surface that would be caused by a failure in one channel is compensated by motion of the other channel in response thereto. Such systems utilize individual electromechanical servo actuators whose outputs are combined by a motion summing mechanism of the differential gear type. Applicant's assignee's U.S. Pat. No. 3,504,248 referred to hereinabove describes the basic over-all functioning of such a dual servo system.

The present invention is an improvement over similar dual channel servosystems disclosed in the above-mentioned Miller U.S. Pat. Nos. 3,504,248 and 4,035,705, as well as in said Ser. No. 811,653. As described in both of these patents and patent application, the failure compensation property is inherently obtained because the differential gear mechanism thereof is utilized at a reversible point in the system to combine and couple the motions of the two rotary servomotors of the servo channels to the control surface. It is the inherent property of a mechanical differential that it will transmit to one of its members the weaker of two torques applied at its other elements. In the preferred embodiment herein described, the closed loop rate term for each channel is derived from the differential output, i.e., control surface position; and thereby increases the position stiffness of the one servo channel and to minimize transients of the output member due to a failure of the other channel. Another feature of this invention provides a new and improved equalization subsystem having dynamic equalization limits, i.e., limits which are varied in accordance with the magnitude of the system command signal. In addition, a further feature of this invention provides an improved fault isolation subsystem which insures the integrity of the sensors by means of a created third position estimate of the output member's position to provide the automatic control system with a fail-operation capability.

Figure 1A:
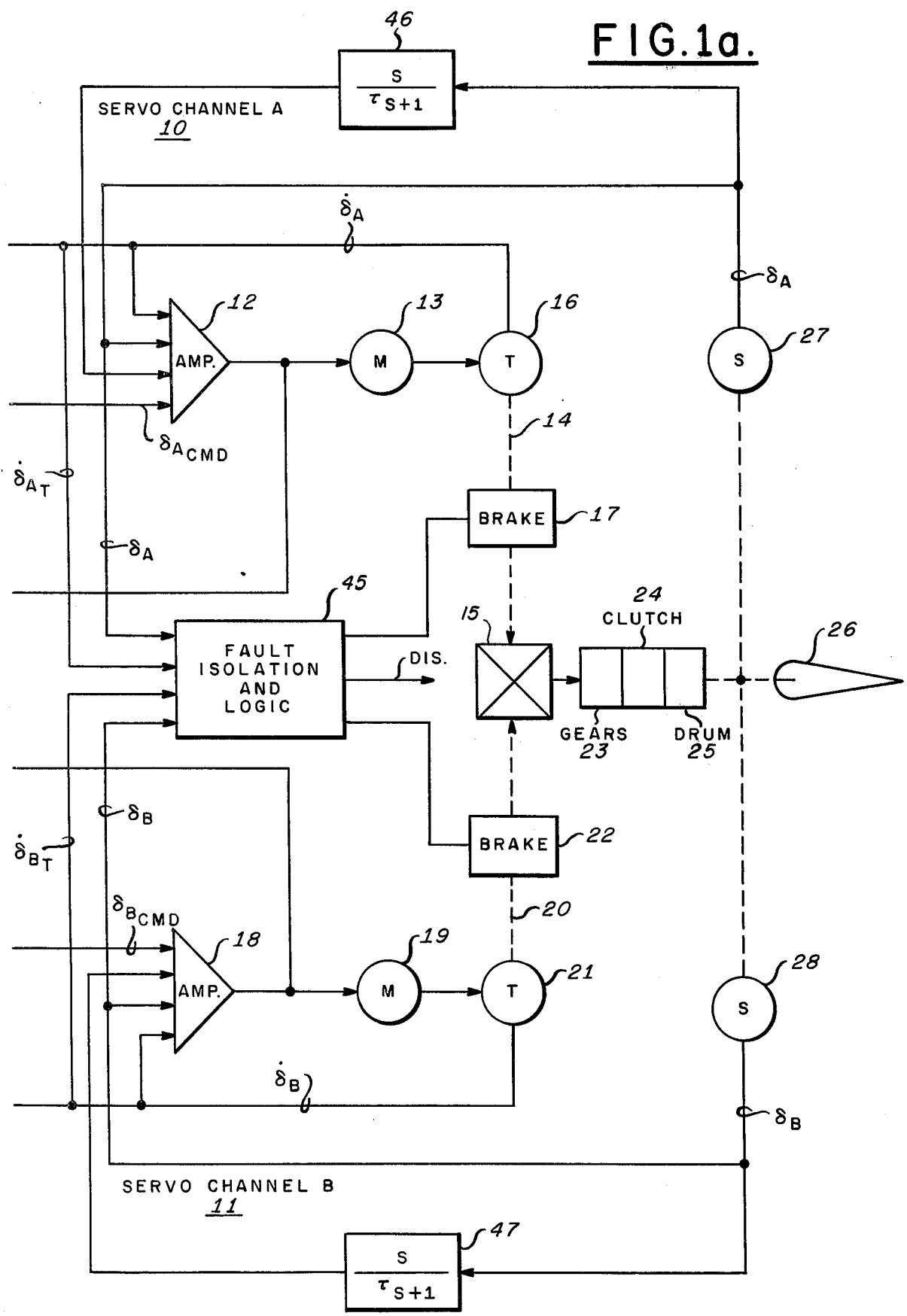
FIGS. 1A and 1B together illustrate in block diagram format a preferred embodiment of the present invention in connection with a dual channel, duplex electromechanical servosystem of an automatic flight control system.
Figure 1B:
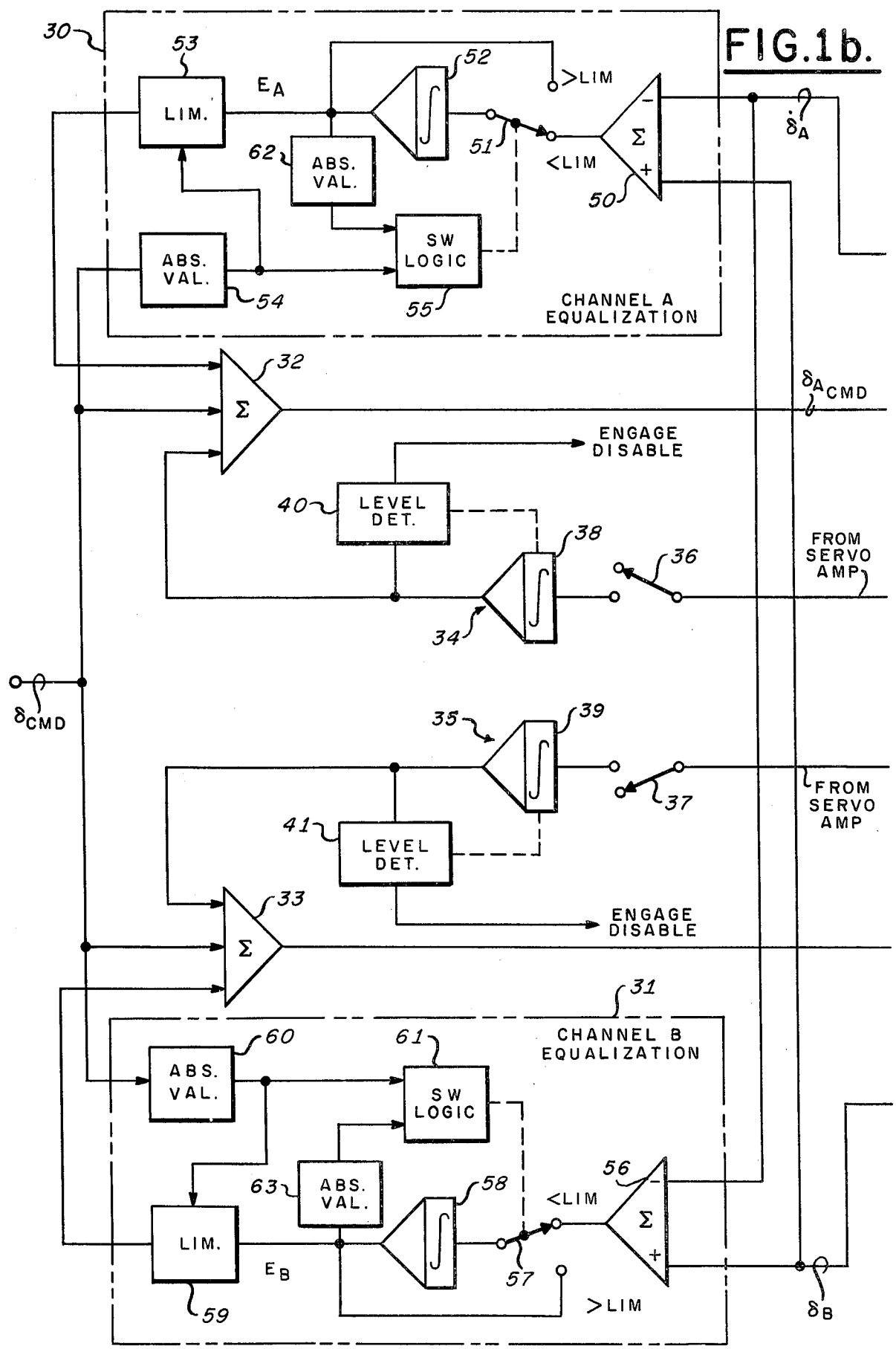

Referring now to FIGS. 1A and 1B of the drawings, the dual channel servosystem is substantially as disclosed in the above-identified patents and application. As the structure and operation of the basic stabilization and control of the present system is the same as and fully described in the above references, it will only be briefly discussed herein for continuity. The dual channel servosystem is comprised of a first closed loop servo channel "A" and an identical second closed loop servo channel "B". The "A" servo channel is responsive to a command signal $\delta_{ACMD}$ and includes a servo amplifier 12 which energizes an electromechanical servomotor 13 in response to the command signal. The servomotor 13 is coupled to an output shaft 14 to provide one input to a reversible mechanical differential 15. A tachometer generator 16 may be coupled to the shaft 14 and is normally integral with the servomotor 13. The tachometer generator 16 measures the velocity of the output of the servomotor 13. The velocity output of the tachometer generator 16 is applied in conventional rate feedback to an input of the servo amplifier 12 at a predetermined gain to provide speed stability to the motor and this signal is also utilized for other purposes in accordance with the present invention in a manner to be later described.

The output shaft 14 of the servo channel "A" 10 may be clamped by a brake 17 which is preferably instrumented as an electrical brake of a type which is spring released to its clamped position when the power is removed from the brake solenoid. The brake 17 may be of the type described in U.S. Pat. No. 3,504,248 but is activated in accordance with the present invention in a manner to be hereinbelow described.

The servo channel "B" 11 includes respective components substantially identical to the components 12 through 14 and 16 and 17 of the servo channel 10 and are designated by the reference numerals 18 through 22, respectively.

The mechanical differential gear 15 algebraically sums the velocities of the servomotors 13 and 19 and provides the summed or resultant velocity through associated power gears 23, an electrical autopilot engage clutch 24, and a cable and drum assembly 25, to actuate a control surface 26 in the same manner as described in the referenced Miller patents. It will be understood that the output of the cable and drum assembly 25 may be used to control a boost actuator which actually positions the control surface.

The position of the control surface 26 as controlled by the output from the duplex servo through the differential gear 15 is measured redundantly by servo position sensors 27 and 28, such as synchro transducers, coupled thereto at a point between the clutch 24 and the control surface 26 by appropriate mechanical coupling. The synchros are excited by completely isolated power sources not indicated on the drawings. The output of each of the synchros or sensors 27 and 28 represents the actual position of the control surface 26 and are indicated by the legend $\delta_A$ and $\delta_B$, respectively, in the drawings. These signals are utilized as independent servo position feedback signals to the servo channels "A" and "B", 10 and 11, respectively, through their respective summing amplifiers 12 and 18. These servo position signals ($\delta_A$ and $\delta_B$) from the sensors 27 and 28 are also utilized in the fault isolation and logic portion of the present invention in a manner to be later described.

As indicated in the above-referenced patents, a significant characteristic of the reversible mechanical differential gear 15 having two sources of torque applied to the inputs thereof from the servo output shafts 14 and 20 is that the differential gear 15 equalizes the net torque output requiring each of the motors 13 and 19 to generate nearly identical values of torque as seen at the differential 15 inputs. Should one servo tend to generate more torque than the other, the differential 15 causes the motors 13 and 19 to rotate at different speeds. The inherent torque equalization characteristics of the dual servo configuration as explained above and in the above-referenced patents may cause equal and opposite rotations on the motors 13 and 19 in the presence of normally expected spurious signals due to servo amplifier unbalance and differences in the gradients and nulls of the stability and path command signals of the two channels. Accordingly, equalization means is utilized between the two channels in a manner which forces the motors 13 and 19 to track each other with regard to speed and direction thereby providing adequate control authority of the servomotors. In accordance therewith, the outputs $\dot{\delta}_A$ and $\dot{\delta}_B$ (shown in the drawings) of the tachometer generators 16 and 21 respectively are both applied as inputs to equalization means 30 and 31 designated as Equalizer A and Equalizer B in FIG. 1B. The polarities of the tachometer signals $\dot{\delta}_A$ and $\dot{\delta}_B$ are applied to the equalizer circuits 30 and 31 as shown in the drawing and in a manner to be herein explained such that the speeds and directions of rotation of the motors 13 and 19 are forced to track each other as long as the equalization signals are within specified dynamic limit values. That is, the dynamic limit values are varied as a function of the commanded position signal ($\delta_{CMD}$) as will be described below.

The equalization signals from the circuits 30 and 31 are applied to summing amplifiers 32 and 33 and are summed with the command signal $\delta_{CMD}$ to be provided as the $\delta_{ACMD}$ and $\delta_{BCMD}$ signals to the respective servo amplifiers 12 and 18. The outputs from the servo amplifiers 12 and 18 are each respectively coupled through a synchronization circuit 34 and 35 through an engage/disengage switch 36 and 37, respectively. The input to the synchronization circuit is coupled through an integrator 38 and 39, respectively, to respective summing amplifiers 32 and 33. The synchronization signal which is fed back to the servo amplifiers 12 and 18, respectively, nulls the amplifiers prior to engagement of the control system. That is, brings the output therefrom to zero, thereby nulling any initial signals to the motors 13 and 19 which would otherwise occur because of tolerances of the position feedback transducers, servo amplifier unbalance and the like. The synchronization signal provides the necessary nulling signal to balance the servo amplifiers 12 and 18, but of greater importance, it verifies that most of the elements of the servosystem are functioning properly. That is, inability to synchronize out an excessive level, as determined by level detectors 40 and 41 is indicative of a servo amplifier failure and a disable signal therefrom disables the system. Furthermore, when the control system is engaged the switches 36 and 37 disconnect the output from amplifiers 12 and 18 to the integrators 38 and 39 such that only the nulling signals at the integrators are coupled to the amplifiers 32 and 33.

A fault isolation and brake logic means 45, FIG. 1A, responsive to the position sensors 27 and 28 and the tachometer generators 16 and 21 is provided to disengage the system or apply a braking signal to the brakes 17 or 22 in a manner to be herein described and to provide the system with a fail-operational capability.

As indicated above, a characteristic of a reversible mechanical differential fed by two sources of torque is that the differential will equalize or "vote" the two torques, and should one source of torque tend to generate more torque than the other source, the differential will cause the two motors to rotate in opposite directions with a net torque output that is the lesser of the two input torques. This inherent torque loading of the differential results in the unique fail-passive failure characteristics of the duplex servo configuration. However, it has been found that by increasing the position stiffness of the output member, transients are minimized and in the event of a failure, such as a hardover failure of one channel, the remaining or "good" channel will response much more rapidly to initiate the required opposite or compensating servomotor response. In accordance with the preferred embodiment of this invention, this objective is obtained by means of a rate taker 46 and 47 responsive to the output of surface position transducers 27 and 28, respectively, the output of which is connected to the servo amplifiers 12 and 18 in typical feedback manner. The rate taker means 46 and 47 provide a derived rate feedback signal of the movement of the output member 26 which increases the position stiffness of the "good" servo to provide rapid servo response to control surface movement. Accordingly, in the event of a failure of one of the servo channels, such as 10, for example, the inherent characteristic of the system results in a small initial output at the control surface 26 which moves the "good" channel transducer 28, the rate of such movement being sensed by the rate circuit 47. This surface rate signal is applied as a high gain signal to servo amplifier 18 to rapidly drive the servomotor 19 in a direction and at a velocity opposite to that of servomotor 13 to thereby cancel the output of the differential 15 to the member 26 and minimize the transient. It is noted that in the preferred embodiment of the invention, the derived rate term is the primary velocity feedback of each of the closed loop channels. However, a percentage (in the preferred embodiment approximately 5%) of the tachometer generator signal $\delta_A$ and $\delta_B$ may be used for inner loop damping and for high motor speed stability.

Referring now to FIG. 1B, the equalization circuits 30 and 31, responsive to the servo rate outputs from the tachometer generators 16 and 21, provide equalization signals to the summing amplifiers 32 and 33, respectively, as indicated above. As indicated in the above-referenced patents, although both motors 13 and 19 will normally track each other, normal tolerances in the position feedback synchro gradients causes small velocity differentials between the motors which tend to increase for larger surface (output member) commands. In order to reduce this velocity differential, a constrained integration equalization signal $E_A$ and $E_B$ is applied to the summing amplifiers 32 and 33 in a manner herein described. Referring now to Equalizer A 30, the tachometer signals $\delta_A$ and $\delta_B$ are applied as inputs to summing amplifier 50 with the polarity as shown, wherein the difference in the outputs of the tachometer generators 16 and 21 is coupled through control switch 51 to equalization integrator 52. The output of the equalization integrator 52 is limited by limiter circuit 53 and is applied as an input to the summing amplifier 32. It is noted that the integrator 52 tends to correct for the difference in the velocities ($\delta_A$ and $\delta_B$) and were it not for the limiter circuit 53, the failure of one channel would be propagated into the remaining or "good" channel. It is furlther noted that the limit on the total equalization signal represents approximately the magnitude required to correct for the normal tolerances in the position synchros' gradient mismatch, which is variable according to the input. For this reason, the limit on the equalization signal of the instant invention is made a function of the absolute value of the surface command signal magnitude $|\delta_{CMD}|$ by means of absolute value circuit 54 and, therefore, equalization need only equalize to the maximum tolerance build-up in the servo loop independent of command signal magnitude. Thus, the equalization limit is a function of displacement and may be represented by the expression $$b_1 |\delta_{CMD}| + b_2 \qquad (1)$$

where $b_1$ and $b_2$ are tolerance threshold constants. The equalization signal $E_A$ from the integrator 52 is coupled through a limiter circuit 53 such that the limited value $E_A$ of the equalization signal is coupled to the command signal summing amplifier 32. Following large surface commands ($\delta_{CMD}$), limiter 53 will be set for larger values than it would be for small surface commands. At such time, the signal at the output of integrator 52, can be expected to be larger than it should be when surface commands are small. Thus, when the surface command returns toward zero or small values, the output of the equalization integrator 52 must be reduced. This reduction is accomplished through the switching logic means 55, an absolute value device 62, and the integration control switch 51. When the absolute value of integrator 52 output exceeds the value computed for limiter 53, switch 51 is commanded by the switching logic means 55 to switch to an integrator "disable" position designated on the figure by the notation >LIM. With switch 51 in the >LIM position, the integrator 52 signal decays exponentially toward zero. The gain of the signal path from the output of the integrator to its respective input determines the time constant of the decay. In the preferred embodiment of the invention, this decay time constant is approximately 0.5 seconds.

When the integrator signal has decayed to an absolute value less than the value $b_1 |\delta_{CMD}| + b_2$, this is sensed by switching logic means 55 and switch 51 is commanded back to the closed loop equalization integration position designated by "<LIM". The closed loop equalization integration is again enabled such that the equilibrium velocity difference $\delta_A - \delta_B$ between motors 13 and 19 is always forced to zero.

The equalization circuit 31 includes respective components substantially identical to the components 50 through 55 and 62 of the equalization circuit 30, which are designated by the reference numerals 56 through 61 and 63, respectively, and provides an equalization signal $E_B$ to summation amplifier 33.

Accordingly, the equalization signals $E_A$ and $E_B$ added to the respective summing amplifiers 32 and 33, may be represented by the equations $$E_A = \int_0^t [K(\dot{\delta}_B - \dot{\delta}_A) - ME_A]\, dt \quad (2)$$

where $K = k_1$ for $|E_A| \leq |E_A|_{LIM}$
$K = 0$ for $|E_A| > |E_A|_{LIM}$
$M = k_2$ for $|E_A| > |E_A|_{LIM}$
$M = 0$ for $|E_A| \leq |E_A|_{LIM}$
and $$E_B = \int_0^t [K(\dot{\delta}_A - \dot{\delta}_{BN}) - ME_B]\, dt$$

where K and M are as defined above except that $|E_B|$ is substituted for $|E_A|$.

The dual servo control system of FIGS. 1A and 1B includes monitor and fault isolation means 45 responsive to the tachometer generators 16 and 21 to monitor the velocity of the servomotors 13 and 19 in order to respond to a failure in their respective channels and brake the appropriate motor through brake means 17 or 22. That is, in a duplex servo system, a large differential velocity between the two motors 13 and 19 is indicative of a channel failure. Thus, if the differential velocity is monitored and does not exceed a predetermined threshold value, as determined by normal tolerances, the brake means 17 and 22 will not be activated. As described by the DeWalt application mentioned above, the differential velocity fault criterion may be used to disengage the servosystem and the fail-passive requirements would be met. However, sufficient information exists in the system to isolate every fault in a failed channel, and in the autoland modes of the preferred embodiment of this invention, this information is advantageously used to make the servosystem fail-operative. A full disclosure of the fault isolation and logic 45 is presented in concurrently filed Ser. No. 890,745. However, the equalization concept herein disclosed may be used with other failure monitor arrangements, the failure criteria of which are based on the differential velocity between the two servomotor systems.

Referring now to FIG. 2, the equalization means of the instant invention is shown as utilized with a dual channel control system having conventional hydraulic actuators differentially summed into a surface boost actuator. It should be recognized that FIG. 2 is a simplified illustration and shows only part of the control linkage mechanism which drives the main valve 84 of the surface actuator. As those skilled in the art of aircraft hydraulic actuators will recognize, there are a great variety of actuator systems for implementing a pilot's manual control input to drive the main servo valve such that the channel A and B actuator inputs do not couple back to the pilot's mechanical input commands. These well known systems add summing linkages to primary actuator link 82. Moreover, these additional linkages include mechanical feedback from the surface to the pilot's input and hence to the main valve travel. These mechanical feedbacks for manual control modes change the actuator response characteristic to that of a position servo rather than a velocity servo. That is, a movement of the main valve 84 will command a velocity of the actuator ram driving the surface but the mechanical feedback from the surface will return the valve to a null or "closed" position. In the electronic control mode described in FIG. 2, the mechanical feedback from surface to valve 84 is not active. The well known art for implementing these linkages changes the mechanism to that of FIG. 2 when the electronic control modes are activated. Thus, in the control mode illustrated, a motion at the main valve 84, will command a velocity of the ram. The velocity can only be brought to zero by returning the main valve to its null position. This must therefore be accomplished by sensing surface motion and reversing the command to the transfer valve (T valves) 74 and 75 of the dual servo actuators.

As in the dual channel servo control system of FIG. 1A, the dual hydraulic actuator control system comprises first and second hydraulic channels A and B, respectively, having command input signals $CMD_A$ and $CMD_B$, respectively, from a common input command source. The dual channels each include a servo amplifier 70, 71 responsive to the respective command signals and which drives a conventional secondary actuator 72, 73 via a conventional transfer valve 74, 75.

The actuators each provide an input to a surface boost actuator 80 via respective output shafts 76, 77 coupled to differential linkage 82. The surface actuator 80 is controlled by conventional main valves 84 through a series of conventional linkages schematically illustrated as coupling 83 and provides the commanded output to the control surface 86 through the usual conventional linkages (not shown). The transfer valves 74, 75 control the position of the actuators 72, 73 through position feedback pick-offs, such as conventional LVDT's 88, 89 mechanically coupled to the output shafts 76, 77. Since the position of secondary actuators 72, 73 controls the velocity of the surface actuator in the electronic automatic mode of operation, the LVDT signals are actually surface velocity signals indicated as $\dot{\delta}_A$ and $\dot{\delta}_B$, respectively. They are applied in conventional rate feedback fashion to an input of the amplifiers 70, 71, respectively, and to the equalization means of the instant invention as described herein.

The position of the control surface 86 is measured by servo position sensors 90, 91, respectively, and coupled thereto by appropriate mechanical coupling (not shown). The output of each, indicated by the legend $\delta_A$ and $\delta_B$, respectively, represents the algebraic sum of the motions of the two actuators 72, 73 which position signals are applied in conventional feedback to their respective servo channel amplifiers 70, 71.

As in FIGS. 1A and 1B, monitor and fault isolation logic 45' monitors the operation of the dual servo system. It is similarly responsive to the difference in the velocities of the two channels for failure detection purposes and is also responsive to surface position for fault isolation purposes, both as described in detail in copending application Ser. No. 890,745, filed concurrently herewith. Upon detection of a velocity difference in excess of a predetermined value, the monitor logic issues a system disengage command which effectively disengages the electronic automatic controls and reverts the system to a manual mode. Alternatively, as described in the copending application, the monitor 45' may function to isolate the failure to a particular channel, issue a logic signal to that channel which renders it ineffective but allows the remaining channel to automatically control the control surface. This is accomplished through conventional hydraulic pressure bypass and mechanical centering mechanisms 95 and 96 well known to those skilled in the hydraulic actuators art.

Equalization means 100 and 101, referred to as Channel A and Channel B equalization, respectively, are each coupled to the outputs of LVDT's 88 and 89 ($\delta_A$ and $\delta_B$) as previously described in connection with FIG. 1B. Furthermore, the equalization means 100 and 101 are coupled to the input command signals $CMD_A$ and $CMD_B$, respectively, and provide a velocity equalization signal $VE_A$ and $VE_B$, respectively, having dynamic limits as previously disclosed in connection with FIG. 1B to respective servo amplifiers 70 and 71. The equalization means 100, 101 is the same as that shown in FIG. 1B as equalization means 30, 31.

As previously indicated with respect to the embodiment of the invention illustrated in FIGS. 1A and 1B, the equalization means 100,101 of FIG. 2 also allows a constrained integration of the tachometer differences to be added to each servo and thereby drive the velocity difference to zero over the dynamic range of operation of the system thereby permitting a tightening of the error detecting threshold of the monitor 45' without causing nuisance monitor trips in those situations where the system's normal tolerances are large.

From the foregoing, it will be appreciated that the present invention provides apparatus for tightening failure detection thresholds for dual velocity summed servos by using dynamically varying equalization limits that compensate for only small tolerance errors in those situations where tolerance errors are known to be small and expanding the limits of equalization for those cases where tolerance errors would be larger, thereby allowing the monitor fault detection error threshold to remain small and consequently minimizing transients to aircraft flight paths if a servosystem failure should occur.

While the invention has been described in its preferred embodiment, it is to be understood that the words which have been used are words of description rather than of limitation and changes within the purview of the appended claims may be made without departing from the true scope and spirit of the invention in its broader aspects.

I claim:

1. A dual channel servo control system for aircraft automatic pilots for positioning a control surface in accordance with an input command signal comprising first and second substantially identical servomotor channels responsive to said input command signal and including corresponding first and second servomotors each normally operating at substantially identical velocities for providing substantially identical first and second output motions in response to said command signal, differential means responsive to said first and second servomotor outputs and having an output coupled to position said control surface, first and second feedback means responsive to said respective first and second servomotors for supplying first and second velocity feedback signals to said first and second channels, respectively, such that upon failure of one of said channels said first and second velocity signals have a differential value that is large compared with the motion of said control surface, and equalization means coupled to each of said channels respectively and responsive to said first and second velocity feedback signals of each of said channels for minimizing any velocity difference between the channels due to normal tolerance mismatch between the components of each channel, said equalization means including integration means, limiter means for limiting the maximum value of the velocity difference between said rate signals, and means responsive to said command signal for varying the limits imposed by said limiting means in accordance therewith.

2. A control system as set forth in claim 1 wherein said integration means being responsive to the difference between said velocity signals, the output signal thereof being supplied to said limiter means.

3. A control system as set forth in claim 2 wherein said equalization means further includes logic means responsive to said command signal and the output signal of said integrator means for disabling said integrator means for values of said output signals of said integrator means greater than a predetermined value.

4. A control system as set forth in claim 3 wherein said logic means includes switch means at the input of said integrator for coupling the output of said integrator back to the input thereof to thereby reduce said output to said predetermined value.

5. A control system as set forth in claim 4 wherein said logic means is responsive to the absolute value of said command signal and said integrator output signal.

* * * * *